United States Patent
Wen et al.

(10) Patent No.: US 10,652,567 B2
(45) Date of Patent: May 12, 2020

(54) APPLICATIONS FOR DECODER-SIDE MODELING OF OBJECTS IDENTIFIED IN DECODED VIDEO DATA

(71) Applicant: Apple Inc., Cupertino, CA (US)

(72) Inventors: Xing Wen, Cupertino, CA (US); Dazhong Zhang, Milpitas, CA (US); Peikang Song, San Jose, CA (US); Xiaosong Zhou, Campbell, CA (US); Sudeng Hu, San Jose, CA (US); Hsi-Jung Wu, San Jose, CA (US); Jae Hoon Kim, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/938,158

(22) Filed: Mar. 28, 2018

(65) Prior Publication Data

US 2019/0306524 A1    Oct. 3, 2019

(51) Int. Cl.
| | | |
|---|---|---|
| *H04N 19/51* | (2014.01) | |
| *H04N 19/44* | (2014.01) | |
| *H04N 19/65* | (2014.01) | |
| *H04N 19/176* | (2014.01) | |
| *H04N 19/91* | (2014.01) | |

(52) U.S. Cl.
CPC ........... *H04N 19/51* (2014.11); *H04N 19/176* (2014.11); *H04N 19/44* (2014.11); *H04N 19/65* (2014.11); *H04N 19/91* (2014.11)

(58) Field of Classification Search
CPC ...... H04N 19/51; H04N 19/176; H04N 19/44; H04N 19/65; H04N 19/91
See application file for complete search history.

(56) References Cited

U.S. PATENT DOCUMENTS

| | | | | |
|---|---|---|---|---|
| 5,959,672 | A * | 9/1999 | Sasaki .................. | H04N 19/503 375/240.14 |
| 9,532,069 | B2 * | 12/2016 | Pace ..................... | H04N 19/54 |
| 9,544,612 | B2 | 1/2017 | Deng et al. | |
| 9,578,345 | B2 * | 2/2017 | DeForest ............. | H04N 19/503 |
| 2013/0155075 | A1 * | 6/2013 | Matsui ................... | G06T 9/001 345/501 |

(Continued)

FOREIGN PATENT DOCUMENTS

WO    2015177162 A1    11/2015

*Primary Examiner* — Jonathan R Messmore
(74) *Attorney, Agent, or Firm* — BakerHostetler

(57) ABSTRACT

Techniques are disclosed for coding and decoding video data using object recognition and object modeling as a basis of coding and error recovery. A video decoder may decode coded video data received from a channel. The video decoder may perform object recognition on decoded video data obtained therefrom, and, when an object is recognized in the decoded video data, the video decoder may generate a model representing the recognized object. It may store data representing the model locally. The video decoder may communicate the model data to an encoder, which may form a basis of error mitigation and recovery. The video decoder also may monitor deviation patterns in the object model and associated patterns in audio content; if/when video decoding is suspended due to operational errors, the video decoder may generate simulated video data by analyzing audio data received during the suspension period and developing video data from the data model and deviation(s) associated with patterns detected from the audio data.

23 Claims, 7 Drawing Sheets

(56) References Cited

U.S. PATENT DOCUMENTS

| | | | |
|---|---|---|---|
| 2015/0178953 A1* | 6/2015 | Gao | G06F 16/9535 |
| | | | 345/681 |
| 2015/0350641 A1* | 12/2015 | Zhou | H04N 19/105 |
| | | | 375/240.02 |
| 2016/0253839 A1* | 9/2016 | Cole | H04N 13/344 |
| | | | 345/420 |
| 2017/0188977 A1* | 7/2017 | Sato | A61B 5/024 |
| 2018/0182151 A1* | 6/2018 | Liu | G06T 13/205 |

* cited by examiner

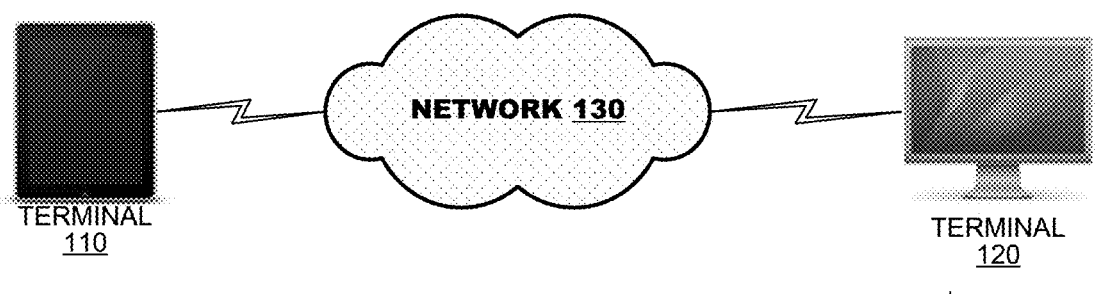
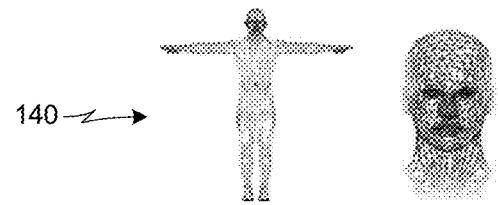
FIG. 1
100

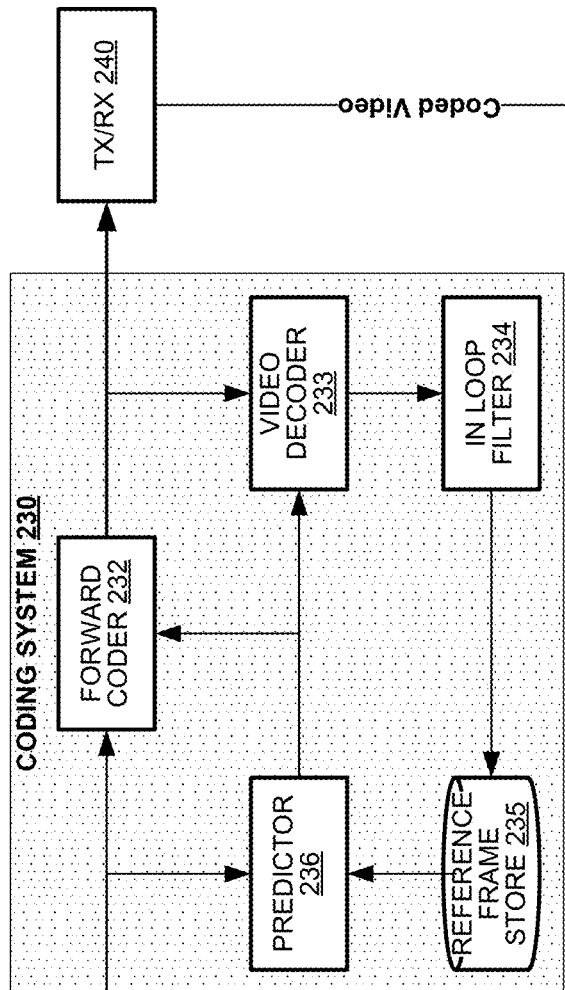
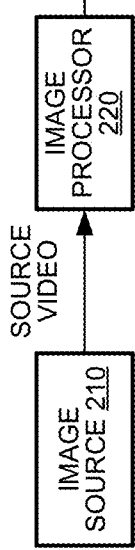
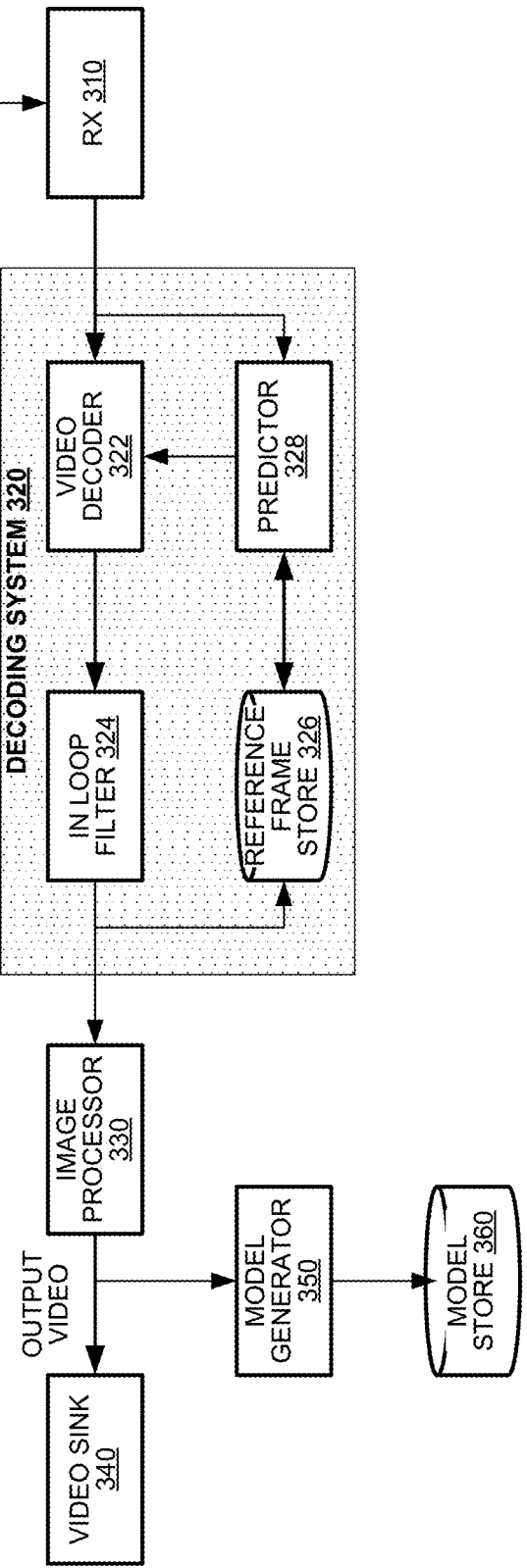

400

500

600

700

800

900

APPLICATIONS FOR DECODER-SIDE MODELING OF OBJECTS IDENTIFIED IN DECODED VIDEO DATA

BACKGROUND

The present disclosure relates to video coding.

Many modern consumer electronic devices support coding, delivery and decoding of video content. Many media players, for example, receive and display programming content (e.g., television shows, movies, and the like) for display. Many communication devices capture video data representing a local environment, code the video data by data compression, and transmit the coded data for consumption by others. The coded video data, once received, must be decoded before it can be consumed by the recipients.

Video coding and decoding techniques exploit spatial and temporal redundancy in video data to achieve bandwidth conservation. These coding techniques, however, create dependencies on image data which can create problems in the presence of communication errors. For example, if a video coder codes a sequence of N frames predictively using a common, previously-coded reference frame as a basis for prediction, none of the N frames can be decoded unless the reference frame is properly received and decoded. If the reference frame were lost due to a transmission error, then the frames that depend on the reference frame cannot be decoded even if the coded data representing those frames are properly received.

BRIEF DESCRIPTION OF THE DRAWINGS

FIG. 1 illustrates a video coding system according to an aspect of the present disclosure.

FIG. 2 is a functional block diagram illustrating components of an encoding terminal according to an aspect of the present disclosure.

FIG. 3 is a functional block diagram illustrating components of a decoding terminal according to an aspect of the present disclosure.

DETAILED DESCRIPTION

Figure 4:
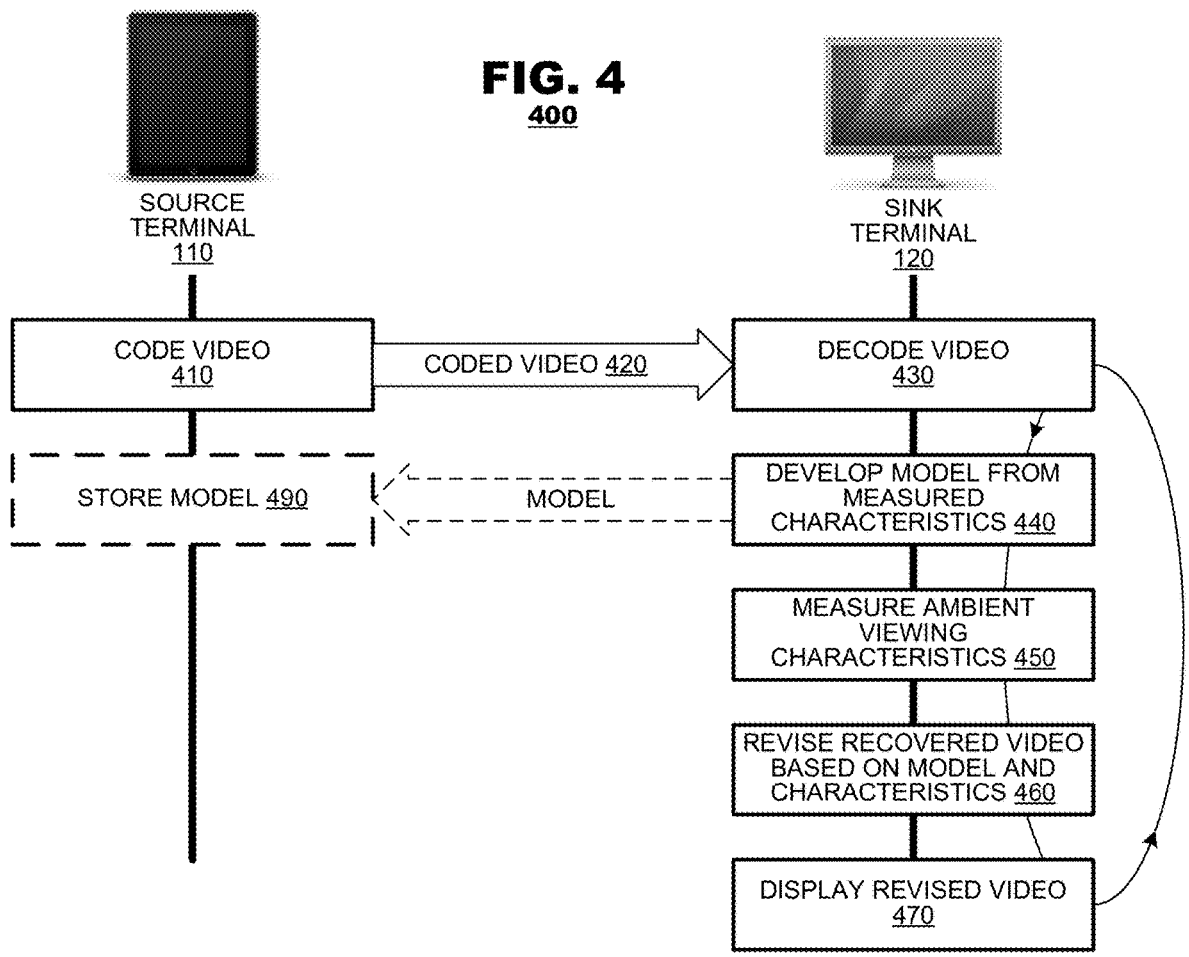
FIG. 4 illustrates a method of operation between terminals according to an aspect of the present disclosure.

Aspects of the present disclosure provide techniques for coding and decoding video data using object recognition and object modeling as a basis of coding and error recovery. According to such techniques a video decoder decodes coded video data received from a channel. The video decoder may perform object recognition on decoded video data obtained therefrom, and, when an object is recognized in the decoded video data, the video decoder may generate a model representing the recognized object. It may store data representing the model locally. The video decoder may communicate the model data to an encoder, which may form a basis of error mitigation and recovery. The video decoder also may monitor deviation patterns in the object model and associated patterns in audio content; if/when video decoding is suspended due to operational errors, the video decoder may generate simulated video data by analyzing audio data received during the suspension period and developing video data from the data model and deviation(s) associated with patterns detected from the audio data.

FIG. 1 illustrates a video coding system 100 according to an aspect of the present disclosure. The system 100 may include a pair of terminals 110, 120 provided in communication via a network 130. A first terminal 110 may code video data for bandwidth compression and deliver the coded video data to the terminal 120 via the network. The terminal 120 may decode the coded video data and consume video data recovered therefrom. Typically, the recovered video data is displayed or stored. In some use cases, the recovered video data may be processed by an application executing on the terminal 120.

As part of its operation, the terminal 120 may generate one or models 140 representing the coded video data. Models may be generated for recognizable objects within image content of the recovered video, for example, human faces, human bodies, or other objects. Models may be generated to represent background content of a video scene. Alternatively, models may be generated to represent an entire scene represented by image content, including both foreground and background content element(s). The terminal 120 may build and refine the models as new recovered video data is generated from the coded video that it receives from the first terminal.

FIG. 2 is a functional block diagram illustrating components of an encoding terminal according to an aspect of the present disclosure. The encoding terminal may include a video source 210, an image processor 220, a coding system 230, and a transmitter 240. The video source 210 may supply video to be coded. The video source 210 may be provided as a camera that captures image data of a local environment, a storage device that stores video from some other source or a network connection through which source video data is received. The image processor 220 may perform signal conditioning operations on the video to be coded to prepare the video data for coding. For example, the image processor 220 alter the frame rate, frame resolution, and/or other properties of the source video. The image processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field frames are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and multi-hypothesis motion compensation predictive coding, in which an input pixel block is coded predictively using decoded data from two or more sources, via temporal or spatial prediction.

The predictive coding modes may be used cooperatively with other coding techniques, such as Transform Skip coding, RRU coding, scaling of prediction sources, palette coding, and the like.

The coding system 230 may include a forward coder 232, a decoder 233, an in-loop filter 234, a frame buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The frame buffer 235 may store the reconstructed reference frames for use in prediction operations. The predictor 236 may predict data for input pixel blocks from within the reference frames stored in the frame buffer. The coding system 230 typically operates according to a predetermined coding protocol such as the ITU-T's H.265 (commonly known as "HEVC"), H.264 ("AVC") or H.263 coding protocol.

The transmitter 240 may transmit coded video data to a decoding terminal via a channel CH.

FIG. 3 is a functional block diagram illustrating components of a decoding terminal according to an aspect of the present disclosure. The decoding terminal may include a receiver 310 to receive coded video data from the channel, a video decoding system 320 that decodes coded data, a post-processor 330, and a video sink 340 that consumes the video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoder 320 may perform decoding operations that invert coding operations performed by the coding system 230. The video decoder may include a decoder 322, an in-loop filter 324, a frame buffer 326, and a predictor 328. The decoder 322 may invert the differential coding techniques applied by the coder 142 to the coded frames. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The frame buffer 326 may store reconstructed reference frames for use in prediction operations. The predictor 328 may predict data for input pixel blocks from within the reference frames stored by the frame buffer according to prediction reference data provided in the coded video data. The video decoder 320 may operate according to the same coding protocol as the encoder, for example, the ITU-T's H.265 (commonly known as "HEVC"), H.264 ("AVC") or H.263 coding protocol.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, reconstructed video generated by a notebook computer may be transmitted to a large flat panel display for viewing.

The model generator 350 may generate object models from output video generated by the decoding terminal 300. The model generator 350 may perform object detection upon the output video to identify objects for which models are to be generated, then may generate the models that represent the detected objects. The models may be represented, for example, as nodes of a wireframe model or in another convenient representation. The model generator 350 may store data representing the model(s) in a model store 360.

The foregoing discussion of the encoding terminal and the decoding terminal (FIGS. 2 and 3) illustrates operations that are performed to code and decode video data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

FIG. 4 illustrates a method 400 of operation between terminals according to an aspect of the present disclosure. According to the method 400 a source terminal 110 may code video data (box 410) and transmit the coded video to a sink terminal 120 (msg. 420). The sink terminal 120 may decode the video data (box 430). The sink terminal 120 also may develop a model of an object in recovered image data from measured characteristics of the recovered image data (box 440).

The sink terminal 120 also may measure viewing characteristics of an ambient environment in which the sink terminal 120 is located (box 450). The sink terminal 120 may revise the recovered video using the model that it develops and the measured viewing characteristics (box 460) and it may display the revised video data at a display (box 470). The method 400 may repeat over the course of a video coding session, where new input data is coded at a source terminal, transmitted to a sink terminal, decoded and displayed with reference to ambient viewing characteristics and a model representing the decoded video data.

The techniques described in FIG. 4 permit a sink terminal 120 to revise display of recovered video data in a variety of ways. For example, a sink terminal 120 may determine locations of viewers within a room and revise presentation of recovered video data to match the detected locations. If, for example, a sink terminal 120 detects that a majority of viewers are located away from a normal axis of the display's surface (e.g., to the right of the display), then the sink terminal 120 may alter presentation of the recovered video data according to the model. The sink terminal 120 may reorient the model according to the perceived locations of the viewers, and generate revised video according to those locations (e.g., by rotating the model toward the right).

Optionally, the sink terminal 120 may transmit data describing its locally-generated model to the source terminal 110 (msg. 480) where it is stored (box 490). During coding of video data, the source terminal 110 may code video data (box 410) predictively using stored model information as a basis of prediction.

Figure 5:
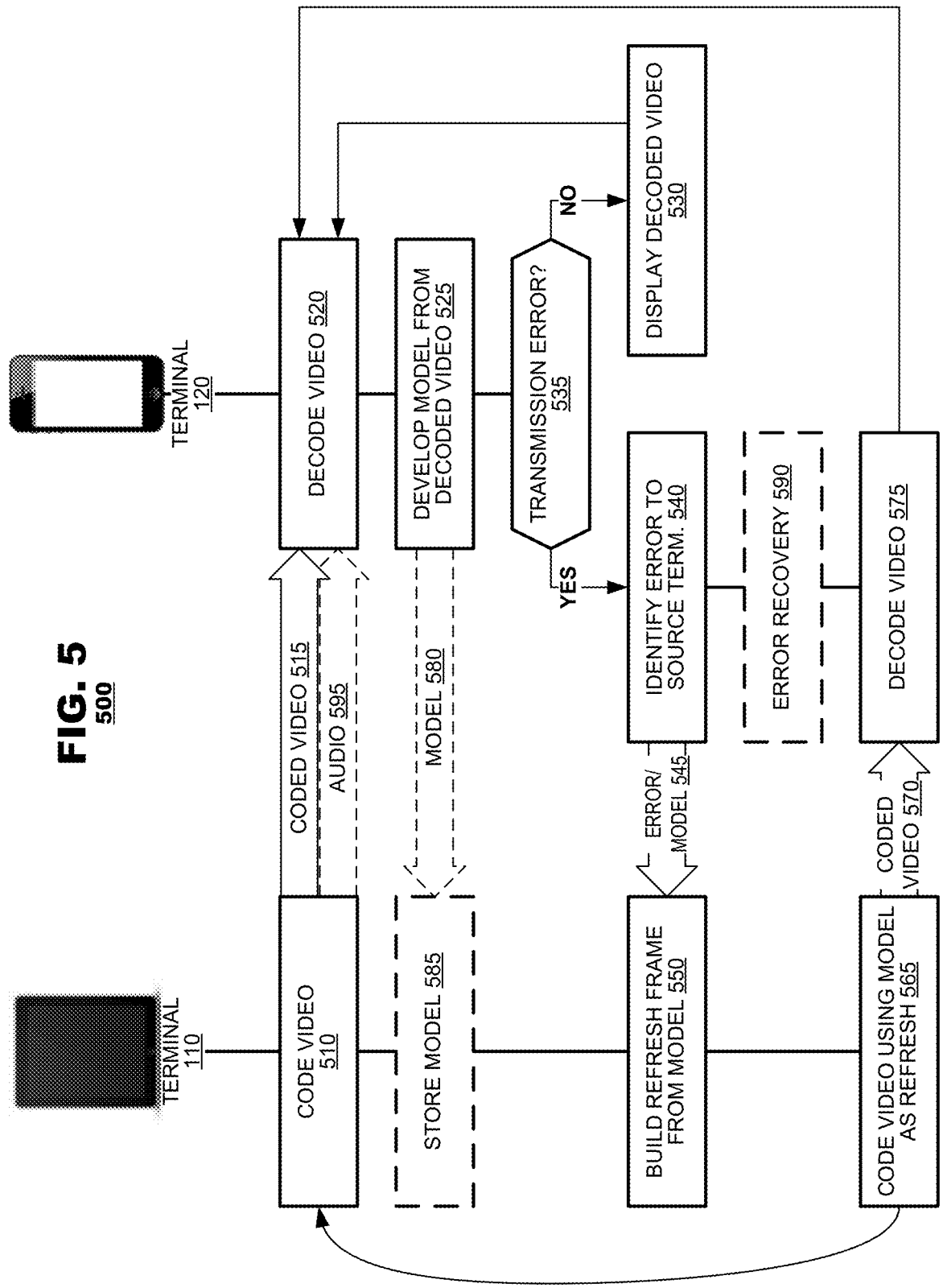
FIG. 5 illustrates a method of operation between terminals according to an aspect of the present disclosure.

FIG. 5 illustrates a method 500 of operation between terminals 110, 120 according to an aspect of the present disclosure. According to the method 500, a source terminal 110 may code video data (box 510) and transmit the coded video to a sink terminal 120 (msg. 515). The sink terminal 120 may decode the video data (box 520). The sink terminal 120 also may develop a model of an object in recovered image data from the recovered image data (box 525). The sink terminal 120 may display the decoded video (box 530). The operations of elements 510-530 may repeat over the course of a video coding session as the source terminal 110 codes new input data, transmits the coded video to the source terminal 120 and the source terminal 120 decodes and displays the coded video.

The sink terminal 120 may determine when transmission errors occur in reception of coded video from the source terminal 110 (box 535). When no transmission errors are detected, the method 500 may continue to display decoded video (box 530) as discussed above. When transmission errors are detected, however, the method 500 may engage in an error recovery process. The sink terminal 120 may identify the transmission error to the source terminal (box 540) and, as part of the identification, provide data identifying the model to the source terminal (msg. 545). In response, the source terminal 110 may build a refresh frame from the model data provided by the sink terminal (box 550). The source terminal 110 may code new video data using the refresh frame as a basis of prediction (box 555) and send the newly-coded video data to the sink terminal 120. Thereafter, the source terminal 110 may return to box 510 and resume normal operation. The sink terminal 120 may decode the video (box 575) that was coded using the refresh frame and return to box 520 to resume normal operation.

The method 500 finds application in environments where transmission errors can occur. When a transmission error is detected, coding may be performed with reference to a model that is confirmed by a decoder to be a reliable basis for prediction. Thus, an encoder resumes coding from a reference model that is known to be good at a decoder, which can lead to faster recovery than in other error recovery techniques.

In an aspect, a sink terminal 120 may transmit data representing its locally-developed model (msg. 580) to the source terminal 110 on an ongoing basis. The source terminal 110 may store the model locally (box 585). In such an embodiment, when the source and sink terminals engage in error recovery processes (boxes 540-375), the source terminal 110 will store the model (box 585) before it receives an identification of the error (msg. 545) from the sink terminal 120. In such an embodiment, a sink terminal 120 need not transmit the model data when an error is detected. Instead, the sink terminal 120 may transmit a shorter message (one that ideally would be less susceptible to transmission errors) identifying the presence of an error.

In another aspect, when a transmission error is detected, a sink terminal 120 may engage error recovery processes (box 590) upon data that is received prior to reception of coded video (msg. 570) generated using the model as refresh data. For example, the sink terminal 120 may interpolate output video content from model(s) stored locally at the sink terminal 120 and from audio content received from the channel (msg. 595). The sink terminal 120 may introduce predetermined movement variations to a model of a speaker, which may provide a more natural representation of a speaker in the event of data loss.

In a further aspect, a source terminal 110 may code video data (box 510) with periodic reference to models reported by a sink terminal 120. That is, new image data may be coded differentially with respect to a model reported by a sink terminal (msg. 580) on a regular basis. The model-based coding may supplement ordinary coding of image data. If/when transmission errors are encountered (box 535), a sink terminal 120 may refer to frame(s) that are coded by the model-based coding, decode the frame(s) and resume coding of other frames thereafter.

In another aspect, a source terminal 110 may represent coding parameters with reference to models provided by a decoder. Once provided with a model generated by a sink terminal 120, a source terminal 110 may represent coding parameters, such as motion, using the model as a basis. For example, the source terminal 110 may represent a change in orientation of a wire-frame model, which provides a basis to predict motion vectors of individual nodes or polygons within the model. The source terminal 110 may code motion vectors of image content (for example, pixel blocks of an image) differentially with respect to the node-based/polygon-based motion vectors that are contained within the pixel blocks.

In a further aspect, a source terminal 110 may refer to a sink terminal model for coding individual content elements within source frames. For example, once a model is received from a sink terminal 120, a source terminal 110 may distinguish foreground content from background content in new frames that are received. The source terminal 110 may code the foreground content but omit coding of background content and instead, may refer to the sink terminal's model. On decode the sink terminal 120 may decode coded data representing the foreground content and merge the recovered data with background content elements derived from its own model.

In another aspect, an encoder can manipulate the decoder-provided model data to generate reference frames. The encoder can then use these reference frames to achieve better compression efficiency. The encoder may transmit an encoded bitstream along with parameters to manipulate the decoder model to a decoder. The decoder may re-create the same reference frames as are stored at the encoder, and decode the received video data correctly. If/when an encoder encounters low bandwidth conditions, the encoder may choose to only send the parameters to manipulate the model to save bandwidth. Snapshots of multiple decoder models can be stored by both the encoder and the decoder, which may mitigate recovery latencies when packet loss events occur.

Figure 6:
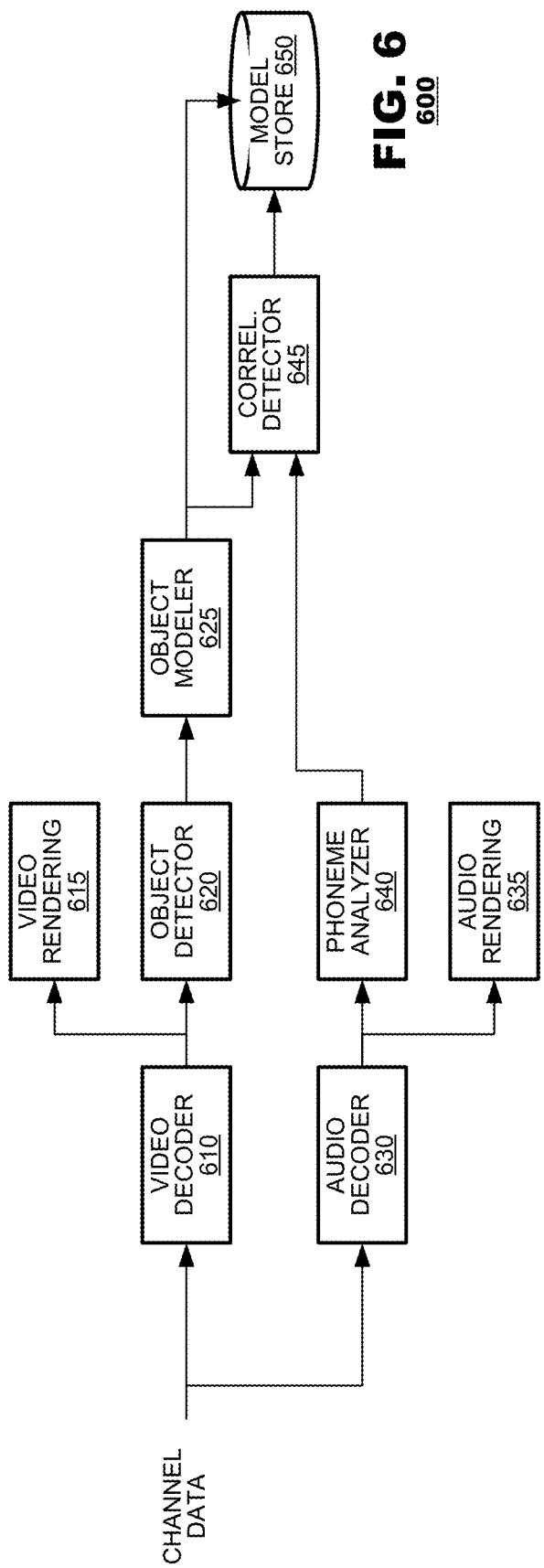
FIG. 6 is a functional block diagram of a model generator according to an aspect of the present disclosure.

FIG. 6 is a functional block diagram of a model generator 600 according to an aspect of the present disclosure. The model generator 600 may have a first set of processing elements 610-625 that process video components of a received media item and a second set of processing elements 630-640 that process audio components of a received media item. For video, the model generator 600 may include a video decoder 610, a video rendering unit 615, an object detector 620, and a modeler 625. For audio, the model generator 600 may include an audio decoder 630, an audio rendering unit 635, and a phoneme analyzer 640. The model generator 600 also may include a correlation detector 645 and a model store 650. The video decoder 610 may perform video decoding according to the techniques described herein to generate a recovered video output from coded video data. The audio decoder 630 may perform audio decoding to generate a recovered audio output signal from coded audio data. The video and audio rendering units 615, 635 respectively may output the recovered video and audio data to sink devices.

The object detector 620 may detect object(s) from image content of the recovered video data, and the modeler 625 may generate model data representing the detected object(s). As discussed, the model data may represent the detected object according to a wireframe model or other convenient representation. In an aspect, the modeler 625 may operate according to the processes described in co-pending application Ser. No. 15/697,208, filed Sep. 6, 2017, the disclosure of which is incorporated herein. The model data also may identify displacements of the object from a rest position of the object which may relate to gestures, inclinations of the object and other configuration of the objects. The object detector 620 may store data representing the object model(s) in the model store 650.

The phoneme analyzer 640 may detect phonemes from within audio content. Phonemes represent perceptible distinct units of speech contained within audio. The phoneme analyzer 640 may identify phonemes from within decoded audio and output data identifying the phonemes and times in which they appear in audio to the correlation detector 645.

The correlation detector 645 may identify correlations between displacements of object(s) from their rest position(s) in the video data to phonemes identifies within the audio data. When correlations are detected, the correlations detector 645 may store data associating the phonemes with the object displacements in the model store 650.

Figure 7:
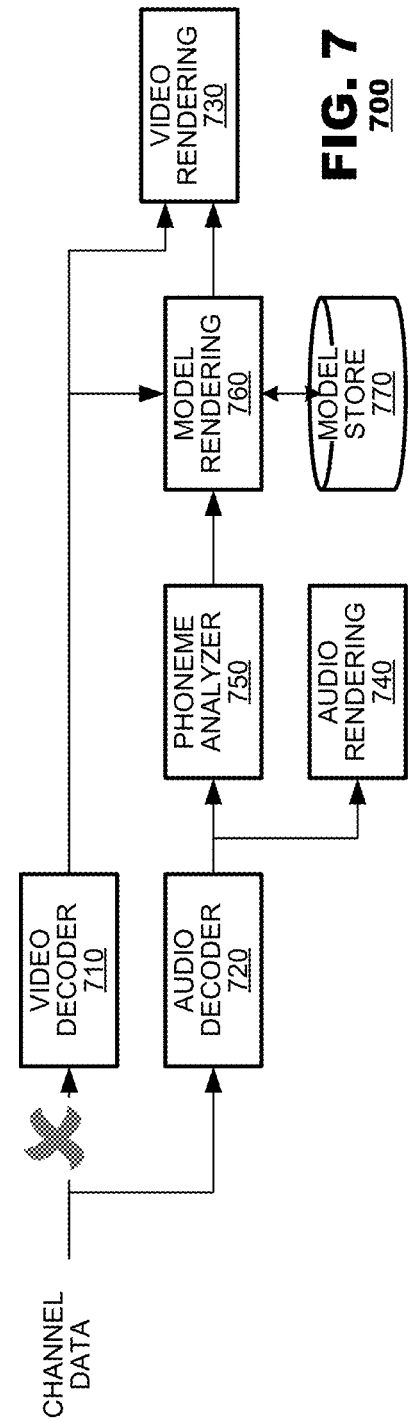
FIG. 7 is a functional block diagram of a model rendering system according to an aspect of the present disclosure.

FIG. 7 is a functional block diagram of a model rendering system 700 according to an aspect of the present disclosure. The system 700 may be engaged in response to a video decoding error at a sink device. The system 700 may include a video decoder 710, an audio decoder 720, a video rendering unit 730, an audio rendering unit 740, a phoneme analyzer 750, a model renderer 760, and a model store 770. The video decoder 710 and the audio decoder 720 may operate as in the foregoing embodiments; during ordinary operation, they may decode coded video data and coded audio data, respectively, and output decoded data to the video rendering unit 730 and the audio rendering unit 740, respectively. The elements of FIG. 7 illustrate operations that may occur when an error is encounter in video decoding, for example, when channel errors or other operational errors prevent the video decoder 710 from generating recovered video.

When video decoding errors arise, the phoneme analyzer 750 may analyze decoded audio data to identify phonemes contained therein. The model rendering unit 760 may retrieve from the model store 770 a model of a speaker that was present in most recently identified decoded video (before the error arose) and may generate a model of the speaker with deviations that are tailored to suit the phonemes recognized in the audio data. The deviations may be developed by the processes shown in FIG. 6 and stored in the model store 650/770. In this manner, the system 700 may generate simulated video data of the speaker for a time until ordinary video decoding processes resume.

In an aspect, the phoneme analyzer 750 also may perform speaker recognition to distinguish among different speakers that are active within a video coding/decoding session. The phoneme analyzer may provide speaker identification to the model rendering unit 760 and phoneme identification, in which case, the model rending unit 760 may generate a model corresponding to the identified speaker and may add deviations that are tailored to suit the phoneme recognized in the audio data. The deviations may be developed by the processes shown in FIG. 6 and stored in the model store 650/770.

Figure 8:
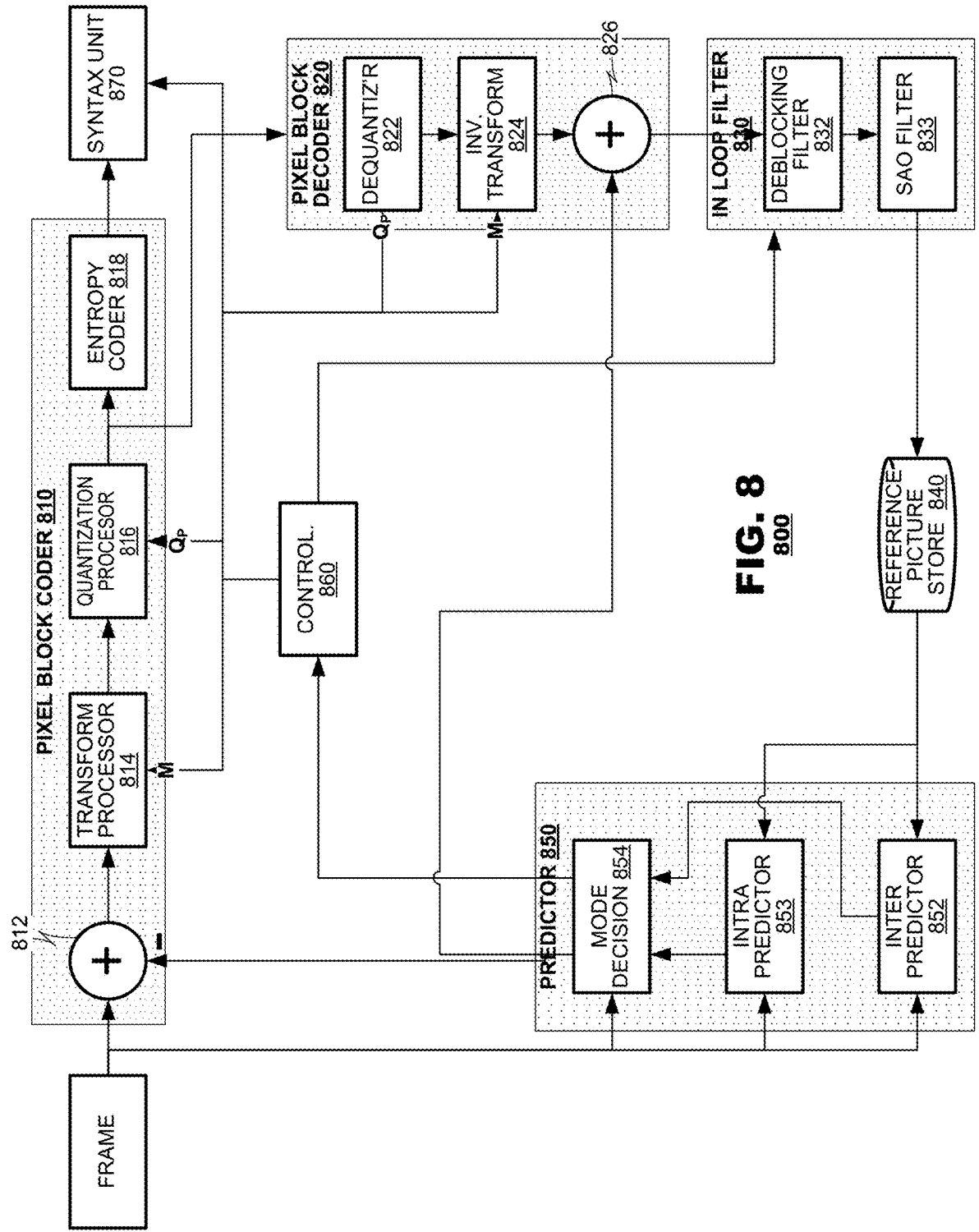
FIG. 8 is a functional block diagram of a coding system according to an aspect of the present disclosure.

FIG. 8 is a functional block diagram of a coding system 800 according to an aspect of the present disclosure. The system 800 may include a pixel block coder 810, a pixel block decoder 820, an in-loop filter system 830, a reference frame store 840, a predictor 850, a controller 860, and a syntax unit 870. The predictor 850 may predict image data for use during coding of a newly-presented input pixel block and it may supply a prediction block representing the predicted image data to the pixel block coder 810. The pixel block coder 810 may code the new pixel block by predictive coding techniques and present coded pixel block data to the syntax unit 870. The pixel block decoder 820 may decode the coded pixel block data, generating decoded pixel block data therefrom. The in-loop filter 830 may perform one or more filtering operations on the reconstructed frame. The reference frame store 840 may store the filtered frame, where it may be used as a source of prediction of later-received pixel blocks. The syntax unit 870 may assemble a data stream from the coded pixel block data, which conforms to a governing coding protocol.

The pixel block coder 810 may include a subtractor 812, a transform unit 814, a quantizer 816, and an entropy coder 818. The pixel block coder 810 may accept pixel blocks of input data at the subtractor 812. The subtractor 812 may receive predicted pixel blocks from the predictor 850 and generate an array of pixel residuals therefrom representing a difference between the input pixel block and the predicted pixel block. The transform unit 814 may apply a transform to the sample data output from the subtractor 812, to convert data from the pixel domain to a domain of transform coefficients. The quantizer 816 may perform quantization of transform coefficients output by the transform unit 814. The quantizer 816 may be a uniform or a non-uniform quantizer. The entropy coder 818 may reduce bandwidth of the output of the coefficient quantizer by coding the output, for example, by variable length code words or using a context adaptive binary arithmetic coder.

The transform unit 814 may operate in a variety of transform modes as determined by the controller 860. For example, the transform unit 814 may apply a discrete cosine transform (DCT), a discrete sine transform (DST), a Walsh-Hadamard transform, a Haar transform, a Daubechies wavelet transform, or the like. In an aspect, the controller 860 may select a coding mode M to be applied by the transform unit 815, may configure the transform unit 815 accordingly and may signal the coding mode M in the coded video data, either expressly or impliedly.

The quantizer 816 may operate according to a quantization parameter $Q_P$ that is supplied by the controller 860. In an aspect, the quantization parameter $Q_P$ may be applied to the transform coefficients as a multi-value quantization parameter, which may vary, for example, across different coefficient locations within a transform-domain pixel block.

Thus, the quantization parameter $Q_P$ may be provided as a quantization parameters array.

The entropy coder 818, as its name implies, may perform entropy coding of data output from the quantizer 816. For example, the entropy coder 818 may perform run length coding, Huffman coding, Golomb coding, Context Adaptive Binary Arithmetic Coding, and the like.

The pixel block decoder 820 may invert coding operations of the pixel block coder 810. For example, the pixel block decoder 820 may include a dequantizer 822, an inverse transform unit 824, and an adder 826. The pixel block decoder 820 may take its input data from an output of the quantizer 816. Although permissible, the pixel block decoder 820 need not perform entropy decoding of entropy-coded data since entropy coding is a lossless event. The dequantizer 822 may invert operations of the quantizer 816 of the pixel block coder 810. The dequantizer 822 may perform uniform or non-uniform de-quantization as specified by the decoded signal $Q_P$. Similarly, the inverse transform unit 824 may invert operations of the transform unit 814. The dequantizer 822 and the inverse transform unit 824 may use the same quantization parameters $Q_P$ and transform mode M as their counterparts in the pixel block coder 810. Quantization operations likely will truncate data in various respects and, therefore, data recovered by the dequantizer 822 likely will possess coding errors when compared to the data presented to the quantizer 816 in the pixel block coder 810.

The adder 826 may invert operations performed by the subtractor 812. It may receive the same prediction pixel block from the predictor 850 that the subtractor 812 used in generating residual signals. The adder 826 may add the prediction pixel block to reconstructed residual values output by the inverse transform unit 824 and may output reconstructed pixel block data.

The in-loop filter 830 may perform various filtering operations on recovered pixel block data once it is assembled into frames. For example, the in-loop filter 830 may include a deblocking filter 832, a sample adaptive offset ("SAO") filter 833, and/or other types of in loop filters (not shown). For example, the in-loop filter 830 may perform adaptive loop filtering (ALF), maximum likelihood (ML) based filtering schemes, deringing, debanding, sharpening, resolution scaling, and the like.

The reference frame store 840 may store filtered frame data for use in later prediction of other pixel blocks. Different types of prediction data are made available to the predictor 850 for different prediction modes. For example, for an input pixel block, intra prediction takes a prediction reference from decoded data of the same frame in which the input pixel block is located. Thus, the reference frame store 840 may store decoded pixel block data of each frame as it is coded. For the same input pixel block, inter prediction may take a prediction reference from previously coded and decoded frame(s) that are designated as reference frames. Thus, the reference frame store 840 may store these decoded reference frames.

As discussed, the predictor 850 may supply prediction blocks to the pixel block coder 810 for use in generating residuals. The predictor 850 may include an inter predictor 852, an intra predictor 853, and a mode decision unit 854. The inter predictor 852 may receive pixel block data representing a new pixel block to be coded and may search reference frame data from store 840 for pixel block data from reference frame(s) for use in coding the input pixel block. The inter predictor 852 may select prediction reference data that provides a closest match to the input pixel block being coded. The inter predictor 852 may generate prediction reference metadata, such as reference picture identifier(s) and motion vector(s), to identify which portion(s) of which reference frames were selected as source(s) of prediction for the input pixel block.

The intra predictor 853 may support Intra (I) mode coding. The intra predictor 853 may search from among pixel block data from the same frame as the pixel block being coded that provides a closest match to the input pixel block. The intra predictor 853 also may generate prediction mode indicators to identify which portion of the frame was selected as a source of prediction for the input pixel block.

The mode decision unit 854 may select a final coding mode from the output of the inter-predictor 852 and the inter-predictor 853. The mode decision unit 854 may output prediction data and the coding parameters (e.g., selection of reference frames, motion vectors and the like) for the selected mode. The prediction pixel block data may be output to the pixel block coder 810 and pixel block decoder 820. The coding parameters may be output to a controller 860 for transmission to a channel. Typically, as described above, the mode decision unit 854 will select a mode that achieves the lowest distortion when video is decoded given a target bitrate. Exceptions may arise when coding modes are selected to satisfy other policies to which the coding system 800 adheres, such as satisfying a particular channel behavior, or supporting random access or data refresh policies.

In an aspect, multi-hypothesis coding may be employed, in which case operations of the inter predictor 852, the intra predictor 853 and the mode decision unit 854 may be replicated for each of a plurality of coding hypotheses. The controller 860 may control overall operation of the coding system 800. The controller 860 may select operational parameters for the pixel block coder 810 and the predictor 850 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 870, which may include data representing those parameters in the data stream of coded video data output by the system 800. The controller 860 also may select between different modes of operation by which the system may generate reference images and may include metadata identifying the modes selected for each portion of coded data.

During operation, the controller 860 may revise operational parameters of the quantizer 816 and the transform unit 815 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 860 may control operation of the in-loop filter 830 and the prediction unit 850. Such control may include, for the prediction unit 850, mode selection (lambda, modes to be tested, search windows, distortion strategies, etc.), and, for the in-loop filter 830, selection of filter parameters, reordering parameters, weighted prediction, etc.

Figure 9:
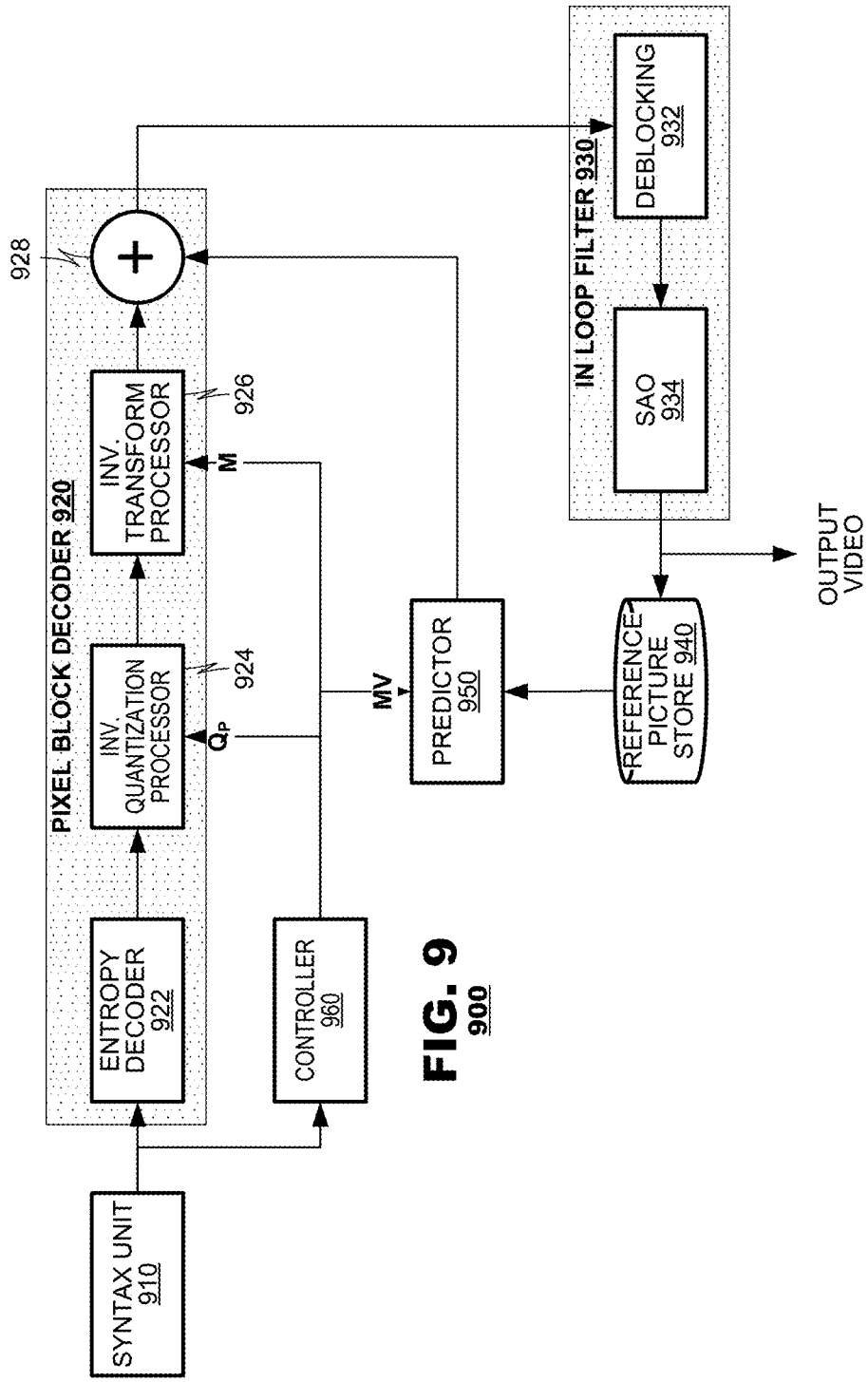
FIG. 9 is a functional block diagram of a decoding system according to an aspect of the present disclosure.

FIG. 9 is a functional block diagram of a decoding system 900 according to an aspect of the present disclosure. The decoding system 900 may include a syntax unit 910, a pixel block decoder 920, an in-loop filter 930, a reference frame store 940, a predictor 950, and a controller 960.

The syntax unit 910 may receive a coded video data stream and may parse the coded data into its constituent parts. Data representing coding parameters may be furnished to the controller 960, while data representing coded residuals (the data output by the pixel block coder 810 of FIG. 8) may be furnished to its respective pixel block decoder 920. The predictor 950 may generate a prediction block from reference data available in the reference frame store 940 according to coding parameter data provided in the coded video data. It may supply the prediction block to the pixel block decoder 920. The pixel block decoder 920 may invert coding operations applied by the pixel block coder 810 (FIG. 8). The in-loop filter 930 may filter the reconstructed frame data. The filtered frames may be output from the decoding system 900. Filtered frames that are designated to serve as reference frames also may be stored in the reference frame store 940.

The pixel block decoder 920 may include an entropy decoder 922, a dequantizer 924, an inverse transform unit 926, and an adder 928. The entropy decoder 922 may perform entropy decoding to invert processes performed by the entropy coder 818 (FIG. 8). The dequantizer 924 may invert operations of the quantizer 816 of the pixel block coder 810 (FIG. 8). Similarly, the inverse transform unit 926 may invert operations of the transform unit 814 (FIG. 8). They may use the quantization parameters $Q_P$ and transform modes M that are provided in the coded video data stream. Because quantization is likely to truncate data, the pixel blocks recovered by the dequantizer 924 likely will possess coding errors when compared to the input pixel blocks presented to the pixel block coder 810 of the encoder (FIG. 8).

The adder 928 may invert operations performed by the subtractor 812 (FIG. 8). It may receive a prediction pixel block from the predictor 950 as determined by prediction references in the coded video data stream. The adder 928 may add the prediction pixel block to reconstructed residual values output by the inverse transform unit 926 and may output reconstructed pixel block data.

The in-loop filter 930 may perform various filtering operations on recovered pixel block data as identified by the coded video data. For example, the in-loop filter 930 may include a deblocking filter, a sample adaptive offset ("SAO") filter, and/or other types of in loop filters. In this manner, operation of the in loop filter 930 mimics operation of the counterpart in loop filter 830 of the encoder 800 (FIG. 8).

The reference frame store 940 may store filtered frame data for use in later prediction of other pixel blocks. The reference frame store 940 may store decoded frames as it is coded for use in intra prediction. The reference frame store 940 also may store decoded reference frames.

As discussed, the predictor 950 may supply the prediction blocks to the pixel block decoder 920. The predictor 950 may retrieve prediction data from the reference frame store 940 represented in the coded video data.

The controller 960 may control overall operation of the coding system 900. The controller 960 may set operational parameters for the pixel block decoder 920 and the predictor 950 based on parameters received in the coded video data stream. As is relevant to the present discussion, these operational parameters may include quantization parameters $Q_P$ for the dequantizer 924 and transform modes M for the inverse transform unit 910. As discussed, the received parameters may be set at various granularities of image data, for example, on a per pixel block basis, a per frame basis, a per slice basis, a per LCU/CTU basis, or based on other types of regions defined for the input image.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video decoding method, comprising, at a decoder:
responsive to coded video data received from a channel, decoding the coded video data by predictive coding techniques,
rendering the decoded video,
performing object recognition on the decoded video data obtained by the decoding,
when an object is recognized in the decoded video data, generating a model representing the recognized object from the decoded video, and
storing data representing the model locally at a decoder.

2. The method of claim 1, further comprising transmitting data representing the model to an encoder that provided the coded video data to the channel.

3. The method of claim 2, further comprising, following the transmitting, decoding a new item of coded video data with reference to the locally-stored data representing the model.

4. The method of claim 1, further comprising:
responsive to detection of a transmission error in the channel, transmitting an identification of the error to an encoder that provided the coded video data to the channel,
thereafter, decoding a new item of coded video data with reference to the locally-stored data representing the model.

5. The method of claim 1, further comprising, responsive to detection of a transmission error in the channel, generating video data for rendering from the locally-stored model data present at the decoder.

6. The method of claim 1, wherein the model data includes data representing the model at rest and data representing deviations of the model from rest, and the method further comprises:
performing phoneme recognition on audio data that is associated with the decoded video data,
detecting correlation between times of recognized phonemes in the audio data and times of the decoded video data associated with the deviations, and
when correlation is detected, storing data identifying the recognized phonemes and the deviations with the data representing the model.

7. The method of claim 6, further comprising, when video decoding is interrupted but audio data is available:
retrieving the model from the local store,
detecting phonemes in the available audio data, and
when phonemes are detected in the available audio data, rendering video data of the model with deviations associated with the detected phonemes applied thereto.

8. The method of claim 1, wherein the model data is stored as wireframe model data.

9. A system, comprising:
a video decoding system, having an input for coded video data received from a channel and an output for decoded video data,
a video sink, having an input for the decoded video data,
a model generator, having an input for the decoded video data and an output for modeling data representing an object detected in the decoded video data, and
a storage device to store the modeling data of the detected object.

10. The system of claim 9, wherein the modeling data is represented as wireframe modeling data.

11. The system of claim 9, wherein the model generator comprises:
an object detector having an input for the decoded video data and an output for data representing detected object(s) in the decoded video data, and
an object modeler having an input for the detected object data and an output for the modeling data.

12. The system of claim 11, further comprising:
an audio decoder, having an output for decoded audio data,
a phoneme analyzer, having an input for the decoded audio data and an output for data representing phonemes detected from the audio data,
a correlation detector, having a first input coupled to an output of the object modeler and a second input coupled to an output of the phoneme analyzer, the correlation detector having an output, coupled to the storage device, for data representing deviations of the object model from a rest position and the phonemes to which they are correlated.

13. The system of claim 9, wherein the video decoding system comprises:
a video decoder, having a first input for the coded video data and a second input for prediction data;
a predictor, having a first input for coded video data and a second input coupled to a reference frame storage device and an output coupled to the second input of the video decoder; and
the reference frame storage device having an input for decoded video data of reference frames.

14. A non-transitory computer readable medium having stored thereon program instructions that, when executed by a processing device, cause the device to perform a method, comprising:
responsive to coded video data received from a channel, decoding the coded video data by predictive coding techniques,
rendering the decoded video,
performing object recognition on decoded video data obtained by the decoding,
when an object is recognized in the decoded video data, generating a model representing the recognized object from the decoded video, and
storing data representing the model locally at a decoder.

15. The medium of claim 14, further comprising transmitting data representing the model to an encoder that provided the coded video data to the channel.

16. The medium of claim 15, further comprising, following the transmitting, decoding a new item of coded video data with reference to the locally-stored data representing the model.

17. The medium of claim 14, further comprising:
responsive to detection of a transmission error in the channel, transmitting an identification of the error to an encoder that provided the coded video data to the channel,
thereafter, decoding a new item of coded video data with reference to the locally-stored data representing the model.

18. The medium of claim 14, wherein the model data includes data representing the model at rest and data representing deviations of the model from rest, and the method further comprises:
performing phoneme recognition on audio data that is associated with the decoded video data,
detecting correlation between times of recognized phonemes in the audio data and times of the decoded video data associated with the deviations, and
when correlation is detected, storing data identifying the recognized phonemes and the deviations with the data representing the model.

19. The medium of claim 18, further comprising, when video decoding is interrupted but audio data is available:
retrieving the model from the local store,
detecting phonemes in the available audio data, and
when phonemes are detected in the available audio data, rendering video data of the model with deviations associated with the detected phonemes applied thereto.

20. The medium of claim 14, wherein the model data is wireframe model data.

21. A video encoding method, comprising, by an encoder:
coding input video data by predictive coding techniques,
outputting coded video data obtained from the coding to a channel,
when a communication is received from a decoder via the channel containing data of an object model developed by the decoder from previously-transmitted coded data, storing the object model data locally at the encoder; and
coding new input video data, by predictive coding techniques using video data derived from the object model data as a basis of prediction.

22. The video encoding method of claim 21, wherein the coding using video data derived from the object model data as the basis of prediction occurs periodically during a video coding session between the encoder and the decoder.

23. The video encoding method of claim 21, wherein the coding using video data derived from the object model data as the basis of prediction occurs in response to an error message received by the encoder from the decoder.

* * * * *